US012203752B2

(12) United States Patent
Liang

(10) Patent No.: US 12,203,752 B2
(45) Date of Patent: Jan. 21, 2025

(54) COMPACT SNAPSHOT DUAL-MODE INTERFEROMETRIC SYSTEM

(71) Applicant: Arizona Board of Regents on Behalf of the University of Arizona, Tucson, AZ (US)

(72) Inventor: Rongguang Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 262 days.

(21) Appl. No.: 17/997,473

(22) PCT Filed: Apr. 28, 2021

(86) PCT No.: PCT/US2021/029733
§ 371 (c)(1),
(2) Date: Oct. 28, 2022

(87) PCT Pub. No.: WO2021/222464
PCT Pub. Date: Nov. 4, 2021

(65) Prior Publication Data
US 2023/0168075 A1 Jun. 1, 2023

Related U.S. Application Data

(60) Provisional application No. 63/017,422, filed on Apr. 29, 2020.

(51) Int. Cl.
*G01B 11/30* (2006.01)
*G01B 9/02* (2022.01)
(Continued)

(52) U.S. Cl.
CPC ....... *G01B 9/02027* (2013.01); *G01B 9/0203* (2013.01); *G01B 9/02041* (2013.01);
(Continued)

(58) Field of Classification Search
CPC ............... G01B 9/0209; G01B 9/0203; G01B 9/02027; G01B 11/30
See application file for complete search history.

(56) References Cited

U.S. PATENT DOCUMENTS 7,292,347 B2   11/2007   Tobiason et al.
8,126,677 B2    2/2012   De et al.
(Continued)

OTHER PUBLICATIONS

Rainer Wilhelm, "Dual-wavelength low-coherence instantaneous phase-shifting interferometer to measure the shape of a segmented mirror with subnanometer precision" Oct. 8, 2008 (Year: 2008).*
(Continued)

*Primary Examiner* — Maurice C Smith
(74) *Attorney, Agent, or Firm* — Perkins Coie LLP

(57) ABSTRACT

Systems, devices and methods for measuring surface roughness and surface shape of an optical element using a dual-mode interferometer are disclosed. The devices implement optical filters, with a compact form, that allows measurement of both surface characteristics without rearranging the system components. One example interferometric system includes a laser light source and a low coherence light source that alternatively provide light to a collimator, followed by a polarizer, and a polarizing beam splitter. The system further includes two optical filters, a quarter waveplate, two objectives and a reference optical component. Each light source produces a set of interferograms, where one set of interferograms is used to measure the surface shape and another set of interferograms is used to measure the surface roughness of the optical component.

20 Claims, 7 Drawing Sheets

(51) Int. Cl.
| | | |
|---|---|---|
| G01B 9/02015 | (2022.01) | |
| G02B 5/08 | (2006.01) | |
| G02B 5/30 | (2006.01) | |
| G02B 27/28 | (2006.01) | |
| G02B 5/28 | (2006.01) | |
| G02B 27/30 | (2006.01) | |

(52) U.S. Cl.
CPC ............ *G01B 11/30* (2013.01); *G02B 5/3025* (2013.01); *G02B 27/283* (2013.01); *G01B 2290/70* (2013.01); *G02B 5/08* (2013.01); *G02B 5/28* (2013.01); *G02B 27/30* (2013.01)

(56) References Cited

U.S. PATENT DOCUMENTS

| | | | |
|---|---|---|---|
| 8,641,194 | B2 | 2/2014 | Primeau et al. |
| 2020/0393240 | A1* | 12/2020 | Marcus .............. G01B 11/0675 |

OTHER PUBLICATIONS

Chen LC, Nguyen XL. Dynamic 3D surface profilometry using a novel colour pattern encoded with a multiple triangular model. Meas Sci Technol 2010; 21: 054009.

Chen S, Li S, Dai Y. Iterative algorithm for subaperture stitching interferometry for general surfaces. J Opt Soc Am A 2005; 22: 1929-36.

Chen XG, Nakamura T, Shimizu Y, Chen C, Chen YL, Matsukuma H, Gao W. A chromatic confocal probe with a mode-locked femtosecond laser source. Opt Laser Technol 2018; 103: 359-66.

Choi H, Trumper I, Dubin M, Zhao W, Kim DW. Simultaneous multi-segmented mirror orientation test system using a digital aperture based on sheared Fourier analysis. Opt Express 2017; 25: 18152-64.

Faber C, Olesch E, Krobot R, Hausler G. Deflectometry challenges interferometry—the competition gets tougher!. Proc SPIE 2012; 8493: 84930R.

Fuh YK, Hsu KC, Fan JR. Rapid in-process measurement of surface roughness using adaptive optics. Opt Lett 2012; 37: 848-50.

International Search Report and Written Opinion mailed Jul. 28, 2021 for International Patent Application No. PCT/2021/029733 (14 pages).

Jiang X, Wang K, Martin H. Near common-path optical fiber interferometer for potentially fast on-line micro scale-nanoscale surface measurement. Opt Lett 2006; 31: 3603-5.

Jiang X. In situ real-time measurement for micro-structured surfaces. CIRP Ann-Manuf Techn 2011; 60: 563-6.

Millerd J, Brock N, Hayes J, North-Morris M, Novak M, Wyant J. Pixelated phase-mask dynamic interferometer. Proc SPIE 2004; 5531: 304-14.

Novak M, Millerd J, Brock N, North-Morris M, Hayes J, Wyant J. Analysis of a micropolarizer array-based simultaneous phase-shifting interferometer. Appl Opt 2005; 44: 6861-8.

Oh CJ, Lowman AE, Smith GA, Su P, Huang R, Su T, Kim D, Zhao C, Zhou P, Burge JH. Fabrication and testing of 4.2m off-axis aspheric primary mirror of Daniel K. Inouye Solar Telescope. Proc SPIE 2016; 9912: 991200.

Sims-Waterhouse D, Piano S, Leach R. Verification of micro-scale photogrammetry for smooth three-dimensional object measurement. Meas Sci Technol 2017; 28: 055010.

Tian X, Deng H, Fujishima M, Yamazaki K. Quick 3D Modeling of machining environment by means of on-machine stereo vision with digital decomposition. Cirp Ann-Manuf Techn 2007; 56: 411-4.

Tian, Xiaobo, et al., "Dual-mode snapshot interferometric system for on-machine metrology," Optical Engineering vol. 58(4), Apr. 2019, (8 pages).

Wang D, Gong Z, Xu P, Wang C, Liang R, Kong M, Zhao J. Accurate calibration of geometrical error in reflective surface testing based on reverse Hartmann test. Opt Express 2018; 26: 8113-24.

Wang D, Liang R. Simultaneous polarization Mirau interferometer based on pixelated polarization camera. Opt Lett 2016; 41: 41-4.

Wang D, Xu P, Gong Z, Xie Z, Liang R, Xu X, Kong M, Zhao J. Transmitted wavefront testing with large dynamic range based on computer-aided deflectometry. J ptics 2018; 20: 065705.

Wang D, Xu Y, Liang R, Kong M, Zhao J, Zhang B, Li W. High-precision method for submicron-aperture fiber point-diffraction wavefront measurement. Opt Express 2016; 24: 7079-90.

Wang D, Yang Y, Chen C, Zhuo Y. Point diffraction interferometer with adjustable fringe contrast for testing spherical surfaces. Appl Opt 2011; 50: 2342-8.

Wyant J, Schmit J. Computerized interferometric measurement of surface microstructure. Proc SPIE 1996; 2782: 26-37.

Yamamoto K, Matsuo T, Imada H, Kino M. Measurement of complex amplitude with a point-diffraction interferometer. Appl Opt 2015; 54: 7895-903.

Yan JW, Baba H, Kunieda Y, Yoshihara N, Kuriyagawa T. Nano precision on-machine profiling of curved diamond cutting tools using a white-light interferometer. Int J Surf Sci Eng 2007; 1: 441-55.

Yang SM, Zhang GF. A review of interferometry for geometric measurement. Meas Sci Technol 2018; 29: 102001.

Zhao C, Burge JH. Stitching of off-axis sub-aperture null measurements of an aspheric surface. Proc SPIE 2008; 7063: 706316.

Zou XC, Zhao XS, Li G, Li ZQ, Sun T. Non-contact on-machine measurement using a chromatic confocal probe for an ultra-precision turning machine. Int J Adv Manuf Technol 2017; 90: 2163-72.

* cited by examiner

COMPACT SNAPSHOT DUAL-MODE INTEROMETRIC SYSTEM

CROSS-REFERENCE TO RELATED APPLICATION(S)

This patent document is a 371 National Phase Application of International Patent Application No. PCT/US2021/029733, filed Apr. 28, 2021, which claims priority to the provisional application with Ser. No. 63/017,422 titled "COMPACT SNAPSHOT DUAL-MODE INTERFEROMETRIC SYSTEM," filed Apr. 29, 2020. The entire contents of the above noted applications are incorporated by reference as part of the disclosure of this document.

STATEMENT REGARDING FEDERALLY SPONSORED RESEARCH

This invention was made with government support under Grant Nos. 1455630 and 1918260, awarded by NSF. The government has certain rights in the invention.

TECHNICAL FIELD

The disclosed technology relates to interferometric systems and methods, and in particular to systems and methods that enable measurement of both surface roughness and surface shape of objects.

BACKGROUND

Interferometry is a recognized method for non-contact surface metrology of optical elements. Laser interferometers can be used to measure low spatial frequency form error of optical surfaces while surface roughness can be measured using low coherence light sources such as white light sources or light emitting diodes (LEDs). With the increased demand for high precision optical components, there is a need for accurate and cost effective method for measuring surface characteristics of optical elements that include both surface roughness and surface shape of optical elements.

SUMMARY

The disclosed embodiments, among other features and benefits, enable the measurement of surface roughness and surface shape using a dual-mode interferometer that relies on optical filters, with a compact form, which makes them suitable for on-machine measurement. Example applications of the disclosed embodiments include metrology, optical testing and measurement.

In one example, an interferometric system for measuring surface characteristics of an object is provided that includes a collimator positioned to receive light from a first light source having a first wavelength or first range of wavelengths, and a second light source having light with a smaller coherence length than light from the first light source, and a second wavelength or second range of wavelengths different from the first wavelength or first range of wavelengths, the interferometric system configured to selectively allow light from one of the light sources to reach the collimator at a given time. The interferometric system also includes a polarizer positioned to receive collimated light from the collimator and to produce polarized light, and a polarizing optical element positioned to receive the polarized light and to direct light having a first polarization towards a first optical filter as part of a reference path of the interferometric system, and to direct light having a second polarization towards a second optical filter as part of a test path of the interferometric system. The interferometric system further includes a quarter wave plate positioned to receive the light having the first polarization in the reference path after reflection from the first optical filter or a reference optical element, and to receive light having the second polarization in the test path after reflection from the object, and to produce oppositely circularly polarized light beams. The first optical filter is configured to allow the light having the first wavelength or the first range of wavelengths to reflect therefrom, and the light having the second wavelength or the second range of wavelengths to transmit therethrough for illumination of a reference optical element. The second optical filter has a thickness or a material to impart the same optical path length to light having the second wavelength or range of wavelengths as the first optical filter and configured to allow the light having the first wavelength or the first range of wavelengths, and the light having the second wavelength or the second range of wavelengths, to transmit therethrough for illumination of the object. The oppositely circularly polarized light beams, upon reaching a polarization sensitive camera at an image plane of the interferometric system and formation of a plurality of interferograms, enable measurements of a surface shape or a surface roughness of the object based on interferograms produced from light from the first light source or the second light source, respectively.

DETAILED DESCRIPTION

Figure 1A:
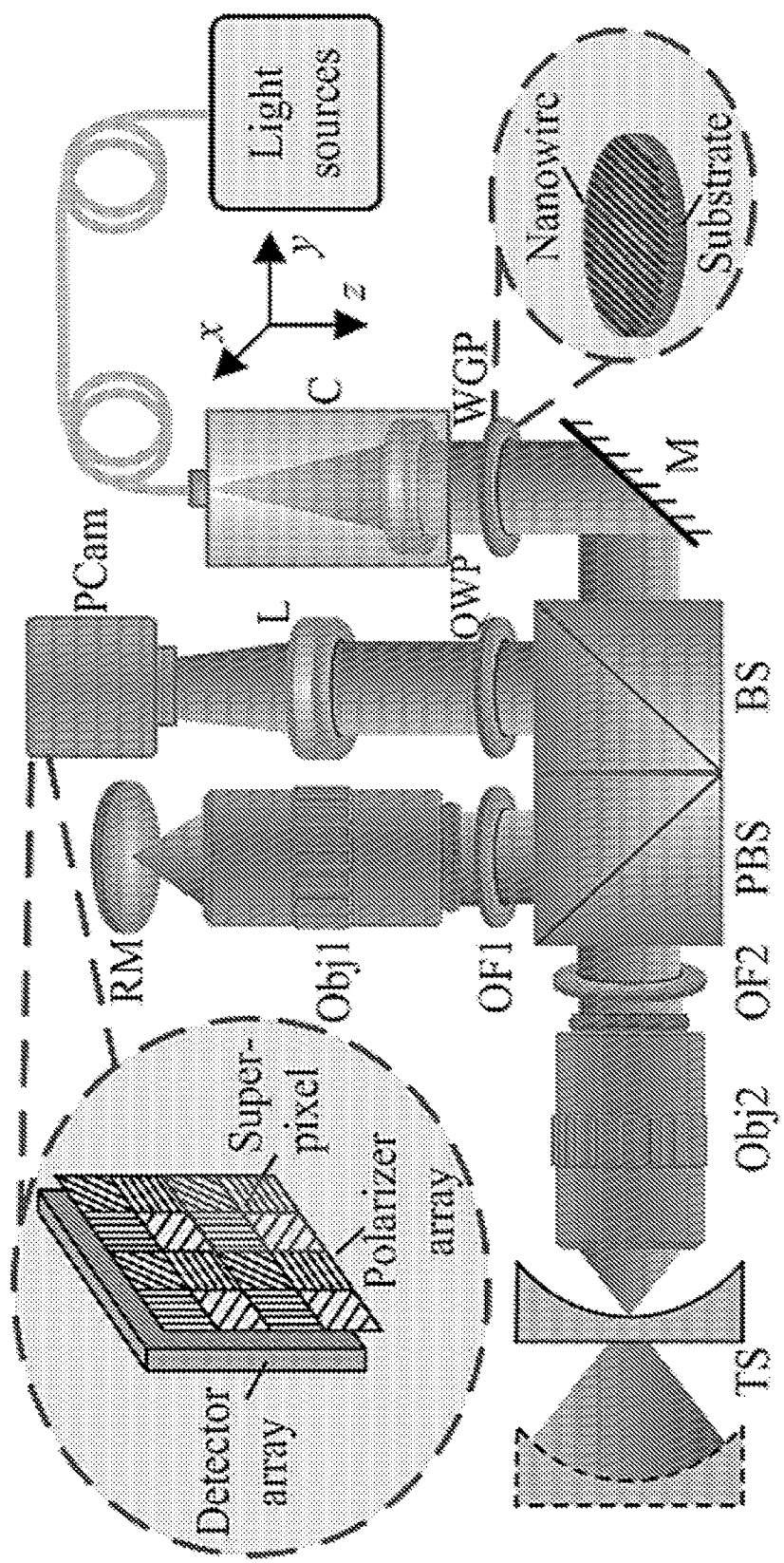
FIG. 1A illustrates a snapshot dual-mode interferometric system in accordance with an example embodiment.

With increasing needs for high precision optical elements, accurate and efficient fabrication process is in high demand, placing ultrahigh requirements on the measurement tools to improve workpiece quality control and to manage the machining process. As a recognized accurate testing method, interferometry has been a powerful method for non-contact surface metrology of optical elements. Various laser interferometers, such as Fizeau interferometer, Twyman-Green interferometer, and point-diffraction interferometer, have been developed for surface form metrology, which is the low spatial frequency form error. Surface roughness can be measured by the low coherence interference microscopes with either white light sources or light emitting diodes (LEDs). With the combination of laser interferometer and interference microscope, the surface characteristics of workpieces over a wide range of spatial frequencies can be accurately evaluated. Most of the commercially available interferometers, such as those from Zygo and 4D Technology, are designed in a single working mode, either in the interferometer mode or the interference microscope mode. Thus, multiple measuring instruments are required to achieve the comprehensive evaluation of optical surface. Due to the limited space in the fabrication machine and accessibility of workpiece surface, the instrument for on-machine metrology should be compact enough. However, most of these commercial instruments are designed for off-line applications and they are large in volume, and are thus not suitable for on-machine metrology. In particular, the workpiece has to be removed from the machine for off-line metrology and then re-positioned back into the machine for further processing if the quality doesn't meet the specifications. This process is very time consuming, adding to the cost and introducing additional fabrication errors.

Various on-machine and in-process measurement methods and systems have also been developed for ultra-precision machining systems that rely on interferometers, adaptive-optics-assisted systems based on light scattering, chromatic confocal probes, stereo vision techniques, and fringe deflectometry. However, these techniques can only measure either surface shape or surface roughness. A dual-mode snapshot interferometric system using Linnik configuration has also been proposed for on-machine metrology, with dimensions of 304.8 mm×304.8 mm×76.2 mm. However, such a configuration adopts double source paths and requires system reconfiguration by removing the microscope objective in the reference arm in order to switch the working mode. In addition, this configuration is not compact or convenient enough for practical applications.

The disclosed embodiments relate to a compact snapshot dual-mode interferometric system (SDIS) that, among other applications, can be used for on-machine measurement of both optical surface shape and roughness. In the example embodiments, using optical filters, dual working modes are achieved in an extremely compact configuration. To minimize the influence of environmental disturbances, a pixelated polarization camera can be used to realize snapshot and fast measurements. In some embodiments, subaperture stitching techniques can be used to extend the measurement range, thus enabling the testing of surfaces with large apertures. Among other features and benefits, the disclosed SDIS shares a single and almost "common-path" configuration setup for dual working modes, and can be implemented in an extremely compact configuration (e.g., with dimensions of 195 mm×160 mm×65 mm). Moreover, the disclosed systems are configured to include optical filters that enable switching between the working modes without reconfiguration of internal system structure. These and other features disclosed herein make the disclosed systems practical and convenient for applications such as on-machine metrology that benefit from a measurement instrument with a compact footprint that can operate in multiple modes to enables measurement of different sized features.

Figure 1B:
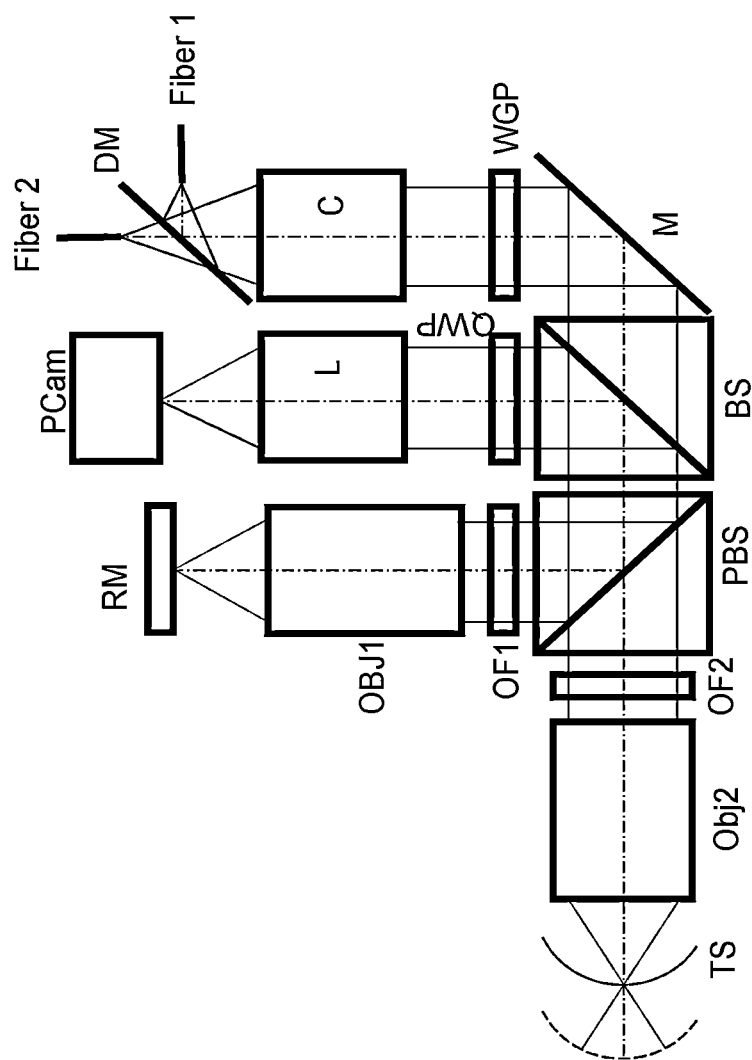
FIG. 1B illustrates a snapshot dual-mode interferometric system in accordance with another example embodiment.
Figure 2:
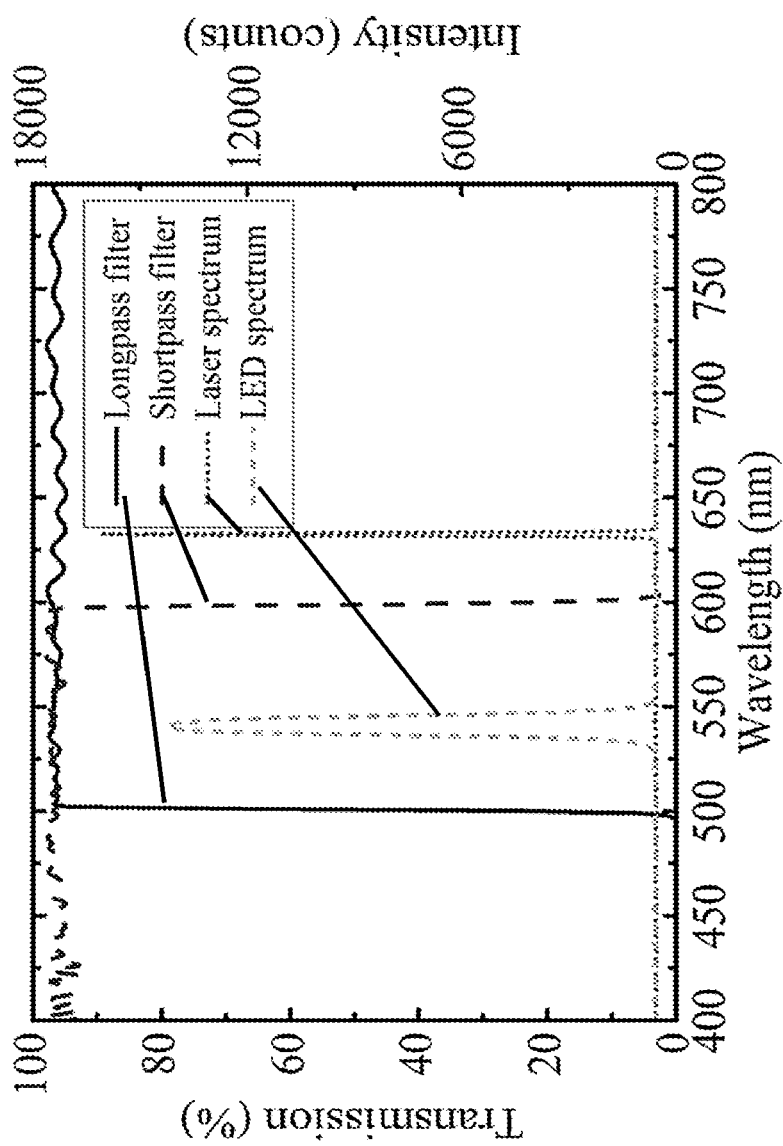
FIG. 2 illustrates an example of the spectrum of the light sources and transmission characteristics of the optical filters that can be used in the disclosed dual-mode interferometers.

FIG. 1A illustrates a diagram of a snapshot dual-mode interferometric system in accordance with an example embodiment. FIG. 1B shows a similar block diagram as in FIG. 1A, but with some of the features removed and some additional features as described herein. Two light sources are used in the system: a laser (e.g., with a wavelength 632.8 nm) for surface shape measurement and an LED (e.g., with a central wavelength 540 nm and linewidth 10 nm) for surface roughness measurement. FIG. 2 illustrates an example of the spectrum of the light sources and transmission characteristics of the optical filters (described below). In the example configurations of FIGS. 1A and 1B, light from the light source(s) is coupled into an optical fiber (e.g., a single-mode optical fiber for laser and a multimode fiber for the LED) and collimated by a collimator (C), and then goes through a polarizer (e.g., a wire grid linear polarizer (WGP)) with its transmission axis oriented at a particular angle, such as 45° to x-axis. By rotating the transmission axis of the polarizer, the relative intensity of the light in the test and reference arms can be adjusted to obtain the optimal fringe contrast.

The collimated linearly polarized light, after reflection from the folding mirror (M), passes through a beam splitter (BS) to a polarizing beam splitter (PBS). The p- and s-polarized beams are transmitted and reflected from the PBS, respectively, serving as test and reference beams. To achieve the different working modes with a single system configuration, a first optical filter (OF1) (e.g., a high-performance shortpass optical filter, such as #84-710, Edmund Optics Inc., with rejection (reflection) wavelength range 614-900 nm and transmission wavelength range 350-587 nm) is placed in the reference arm between the PBS and the first objective lens (Obj1) to reflect the laser beam and transmit the LED light for two different measurement modes. A second optical filter (OF2) (e.g., a longpass filter, such as #62-983, Edmund Optics Inc., with rejection wavelength range 200-490 nm and transmission wavelength range 508-1650 nm) is positioned between the second objective lens (Obj2) and the PBS in the test arm. OF2 is selected to match the optical path length in the test and reference arms for the low-coherence mode of operation. OF2 can be a flat plate with the same material and thickness as OF1 and with anti-reflection (AR) coating on both surfaces.

Example transmission characteristics of example OF1 and OF2 as a function of wavelength are shown in FIG. 2. It should be noted that in FIG. 2, the filters are labeled as shortpass and longpass (with specific transmission characteristics) only for the purposes of illustration and not by limitation. It should be understood that the light sources may have different emission spectra, and OF1 and OF2 may have different passband characteristics based on spectral characteristics of the light sources. In general, OF1 should allow the low-coherence light source (e.g., LED light) to pass therethrough while reflecting the laser light; OF2 should allow both types of light to pass therethrough.

To switch between the working modes, one of the optical fibers with the corresponding light source can be connected to the source interface, e.g., the collimator (C), while the other fiber and/or associated laser is disconnected or turned off, making the system extremely convenient for practical on-machine metrology applications. FIG. 1B illustrates one example configuration for delivering light from the two light sources (e.g., received through Fiber 1 and Fiber 2) to the collimator (C). In this configuration, with the long working distance custom collimator (C) (e.g., an off axis parabolic mirror with a working distance of greater than 10 mm), a dichroic mirror (DM) can be used to deliver both the laser light and the LED light to the collimator (C) so that it is not necessary to switch the fibers. Therefore, two different measurement modes can be implemented by simply turning ON/OFF (or otherwise blocking or disabling) the laser or the LED.

In the laser interferometer mode, the reference laser beam serves as the light source, enabling measurements of the surface form and associated parameters, such as the radius of curvature. In the interference microscope mode, the LED serves as the light source, enabling surface roughness measurements. The two modes of operation, one that uses a laser and one that uses a low-coherence light source, are further illustrated with the aid of FIG. 1C and FIG. 1D, respectively.

Figure 1C:
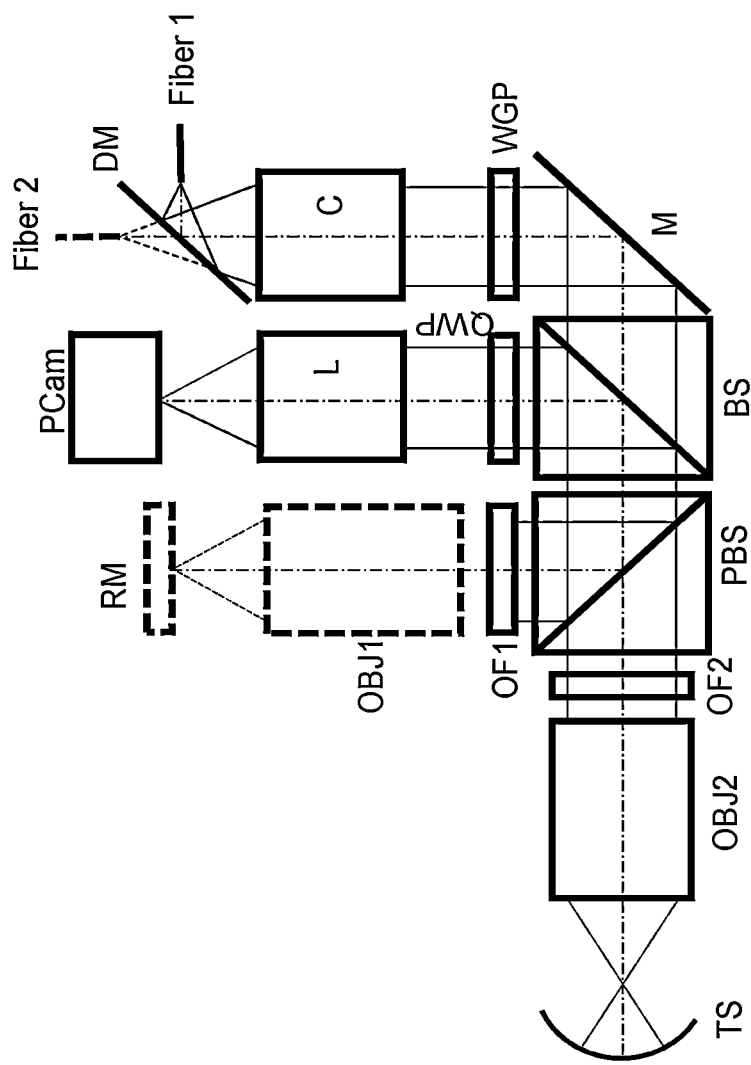
FIG. 1C illustrates the snapshot dual-mode interferometric system of FIG. 1B that is configured to operate in an interferometer mode in accordance with an example embodiment.

In FIG. 1C, laser light from Fiber 1 is delivered to the collimator after reflection from the dichroic mirror (DM). Light that is output from the collimator (C) passes through the polarizer (e.g., WPG) is linearly polarized, is reflected by the folding mirror, passes through the beam splitter (BS), and enters the polarization beam splitter (PBS). The PBS splits the light, such that the light having a particular polarization is reflected by the PBS and is directed to OF1 (this path forms part of the reference path); light having another type of polarization passes through the PBS (this path forms part of the test path). The reference laser beam is reflected by OF1, and is then reflected by the PBS towards the BS. The test beam passes through OF2 and is incident on test sample (TS) by the long working distance objective Obj2 (e.g., Mitutoyo Plan Apo 10× and NA 0.28). Obj2 can transform the light to a spherical wave to match the test surface (TS). In some embodiments, by removing Obj2, the system can be used for testing flat surfaces. The test beam, upon reflection from TS, passes through Obj2, OF2 and PBS toward the BS. Both the test and reference beams that enter the BS are reflected by the BS and pass through a quarter wave plate (QWP), which transforms the orthogonally linearly polarized test and reference beams to oppositely circularly polarized beams. As shown in broken lines, Obj1 and RM are not used in this mode of operation.

Referring again to FIG. 1C, the light that passes through the QWP is received by an imaging lens (L) that images the interference fringes (or interferograms) onto a polarization camera (PCam). In one example that is suited for on-machine measurement, a pixelated polarization monochrome camera from FLIR Systems Inc. can be used to capture the phase-shifted interferograms in a single shot. A Sony polarization image sensor (SONY IMX250MZR, resolution: 2448×2048 pixels, pixel size: 3.45 µm) inside the polarization camera has a built-in micro-polarizer array with four linear polarizers at 0°, 45°, 90° and 135° adjacent to each other, forming a 2×2 superpixel as shown in FIG. 1A. This polarization camera enables a snapshot capture of four interferograms with motionless phase shifting, thus allowing the system to make real time on-machine measurements that is insensitive to environmental disturbances.

Figure 1D:
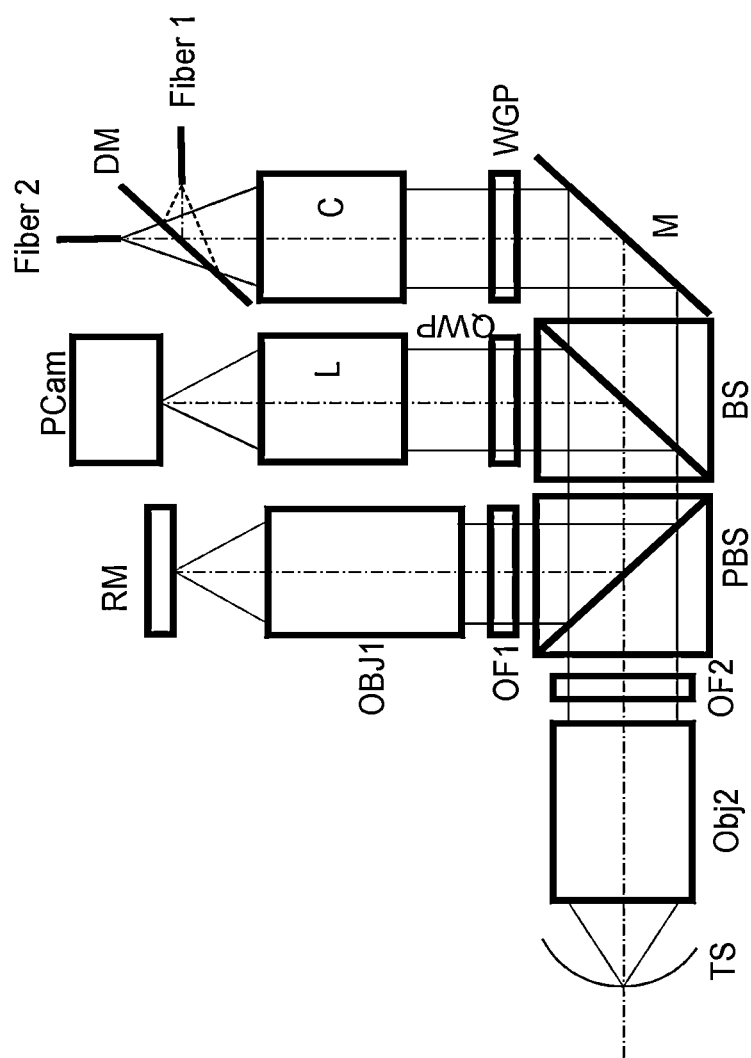
FIG. 1D illustrates the snapshot dual-mode interferometric system of FIG. 1B that is configured to operate in an interference microscope mode in accordance with an example embodiment.

FIG. 1D illustrates the components of the system that are used when the low-coherence light is turned on. Light from the second source (e.g., an LED) is delivered via Fiber 2, passes through the DM to reach the collimator (C). The light then passes through the WGP, is reflected by M, and passes through BS, similar to the first mode of operation described above. The test light passes through the PBS, through OF2, through Obj2, which focuses the test light on TS. The reflected test light travels back through Obj2, through OF2, and through PBS toward the BS. The reference light is reflected by the PBS, passes through OF1 and is focused on the reference optical element (e.g., reference mirror (RM)) by a matching objective Obj1 (e.g., Mitutoyo Plan Apo 10× and NA 0.28). After reflection from RM, the reference light passes back through Obj1 and OF1, and is reflected by the PBS towards the BS. The reference and test beams are reflected by the BS, pass through the QWP and are focused at the image plane of L onto the polarization camera. The PCam then captures the interferences fringes as described in connection with the first mode of operation.

As noted earlier, by rotating the transmission axis of the polarizer, the relative intensity of the light in the test and reference arms can be adjusted to obtain a desired or optimum fringe contrast.

To further facilitate the understanding of the disclosed embodiments, the polarization and propagation of the beams through the example system of FIG. 1A are described using the Jones matrices and specific example values associated therewith. The Jones matrices for test beam ($E_t$) and reference beam ($E_r$) before the polarization camera can be described as:

$$\begin{cases} E_t = J_{QWP} \cdot T_{PBS} \cdot J_{TS} \cdot T_{PBS} \cdot E_{WGP} \\ E_r = J_{QWP} \cdot R_{PBS} \cdot J_{MR} \cdot R_{PBS} \cdot E_{WGP} \end{cases}, \quad (1)$$

where $E_{WGP}$, $F_{QWP}$, $J_{TS}$ and $J_{MR}$ are the Jones matrices for the polarizer WGP, quarter-wave plate QWP, test sample TS and reference mirror RM; $T_{PBS}$ and $R_{PBS}$ are the transmittance and reflectance Jones matrices for the PBS. In an example configuration, $T_{PBS}=[T_p, 0;0, T_s]$ and $R_{PBS}=[R_p, 0;0, R_s]$, where $T_p$ and $R_p$ are the transmittance and reflectance factors for p polarization, $T_s$ and $R_s$ are that for s polarization. Ideally, $E_t$ and $E_r$ can be simplified as $E_t=A'_t \cdot \exp(i\varphi) \cdot [1, i]^T$ and $E_r=A'_r \cdot [1, -i]^T$, where $\varphi$ is the phase difference related to test sample surface, $A'_t$ and $A'_r$ are the corresponding Jones matrix coefficients. Thus, the Jones matrices for the interfering test wave ($E'_{t,j}$) and reference wave ($E'_{r,j}$) after going through the micro-polarizer array in PCam can be represented by:

$$\begin{cases} E'_{t,j} = A_j \cdot E_t = \begin{bmatrix} \cos^2\theta & \cos\theta\sin\theta \\ \cos\theta\sin\theta & \sin^2\theta \end{bmatrix} \cdot E_t \\ E'_{r,j} = A_j \cdot E_r = \begin{bmatrix} \cos^2\theta & \cos\theta\sin\theta \\ \cos\theta\sin\theta & \sin^2\theta \end{bmatrix} \cdot E_r \end{cases}, \quad (2)$$

where $A_j$ (j=1, 2, 3, 4) is the Jones matrix for the micro-polarizer with transmission axis oriented at the angle $\Theta$ ($\theta=0°$, 45°, 90°, 135°) to x-axis. The superposition of test and reference waves in different micro-polarizer orientations is defined as $E'_j = E'_{t,j} + E'_{r,j}$, and the corresponding intensity recorded on the camera is $I_j = |E'_j(1)|^2 + |E'_j(2)|^2$. Thus, the phase difference $\varphi$, which corresponds to the optical path difference between the test and reference surfaces, can be determined with a four-step phase shifting algorithm as:

$$\varphi = \tan^{-1}\left(\frac{I_2 - I_4}{I_1 - I_3}\right). \quad (3)$$

Based on the phase difference $\varphi$, depth, d, can be computed as follows:

$$d = \frac{\lambda\varphi}{2\pi}. \quad (4)$$

In Eq. (4), $\lambda$ is the wavelength of light.

The compact configuration of the disclosed SDIS enables on-machine measurement; however, its measurement range for some convex surfaces can be limited due to the small aperture of the microscope objective. To extend the measurement range, multiple measurements can be carried out, each associated with a subaperture, and then subaperture stitching can be used to combine the subaperture measurements.

Example Prototype Implementations: A prototype of the disclosed SDIS was built with commercial components, forming a compact structure with dimensions of 195 mm×160 mm×65 mm, which is suitable for on-machine measurements. The dimensions can be further reduced by custom components. One example demonstration of the measurements was carried out in Moore Nanotech 350 FG diamond turning machine for tool alignment. In addition, reflective surface with a large aperture was also measured with the prototype SDIS to validate the feasibility of the SDIS in large-aperture surface measurements.

One part of an example experiment related to on-machine tool alignment. Generally, a centering plug is used for tool alignment in a diamond turning machine. The disclosed SDIS provides a powerful tool for on-machine measurement of the centering plug. The SDIS was mounted on a B-axis rotation stage. Before tool alignment, a test flat mirror was placed on the spindle, and the misalignment between the spindle C-axis and optical axis of SDIS was calibrated by nulling the interferogram. A convex surface with a radius of 19.985 mm was first cut on the 11 mm diameter centering plug; the surface shape and roughness were then measured with the SDIS on the machine. In addition, the off-machine control experiments with Zygo Verifire laser interferometer and Zygo NewView 8300 optical surface profiler were also carried out for comparison.

Figure 3:
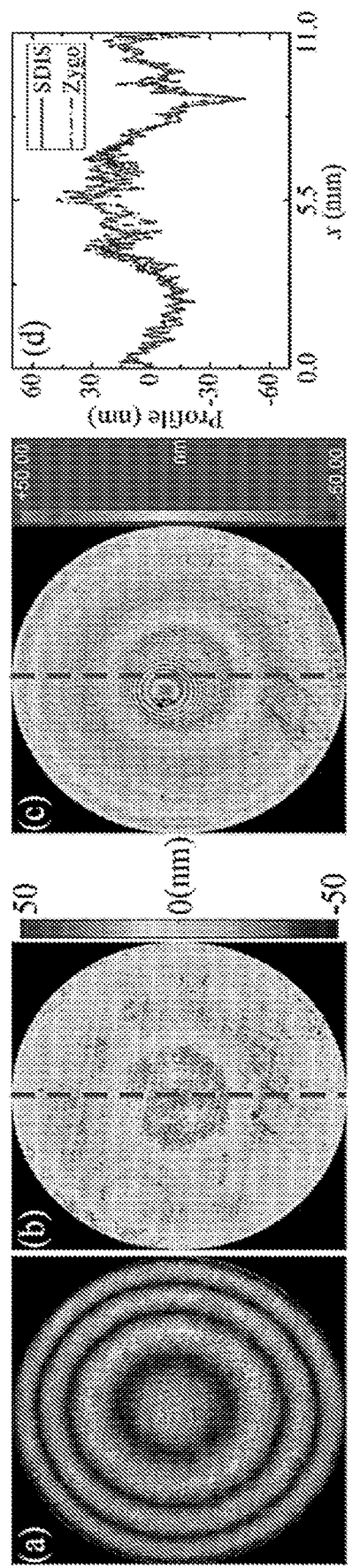
FIG. 3 illustrates measured surface map of a centering plug obtained from a prototype snapshot dual-mode interferometric system based on the disclosed embodiments and comparison of the results obtained using a Zygo interferometer.

For a small-aperture centering plug, the full-aperture surface measurement was achieved by the SDIS. FIG. 3 shows the measured surface map of the centering plug with SDIS and Zygo interferometer, respectively. Panels, (a) and (b) illustrate interferogram and surface shape acquired by the prototype on-machine SDIS, respectively. Panel (c) illustrates the surface shape acquired off-machine using Zygo interferometer, and panel (d) illustrates the comparison of the results. The PV and RMS values of surface map (panel (b)) in the on-machine measurement with SDIS are 0.1276 μm and 0.0147 μm, respectively, and those with off-machine Zygo interferometer (panel (c)) are 0.1142 μm and 0.0123 μm. The line profile comparison of the measured surface with these two systems is given in panel (d), which illustrates a good agreement between SDIS and off-machine measurement. The map error and noise in SDIS is slightly larger than that in Zygo interferometer, which is mainly due to residual systematic error from the imperfect optical elements. In addition, small rings can be seen in the central region of the measured map with Zygo interferometer, which is caused by the attenuation film.

Figure 4:
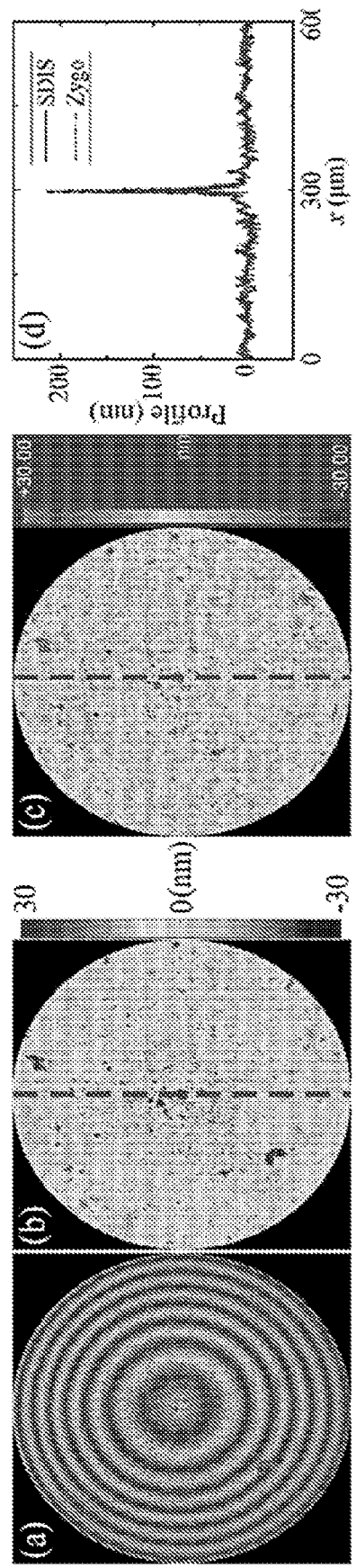
FIG. 4 illustrates measured surface roughness of a centering plug obtained from a prototype snapshot dual-mode interferometric system based on the disclosed embodiments and comparison of the results obtained using a Zygo profilometer.

FIG. 4 shows the measured surface roughness of the centering plug with SDIS and Zygo profilometer, with the measurement area of about 600 μm×600 μm. Panels, (a) and (b) illustrate interferogram and surface roughness acquired by the prototype on-machine SDIS, respectively. Panel (c) illustrates the surface roughness acquired off-machine using Zygo profilometer, and panel (d) illustrates the comparison of the results. The PV, RMS and Ra (arithmetical mean roughness) values measured with the prototype SDIS (panel (b)) are 0.5391 μm, 0.0082 μm and 0.0041 μm, respectively, and those with Zygo profilometer (panel (c)) are 0.5286 μm, 0.0071 μm and 0.0041 μm. The line profile comparison of the measured surface roughness with these two systems (panel (d)) illustrates that a measurement consistency with SDIS and Zygo profilometer is achieved, both in the surface roughness and magnitude. Several factors could lead to the minor difference between on- and off-machine measurement results, such as the cutting debris (bottom left region in panels (a) and (b)), residual systematic error and different bandwidth of LED light sources. Due to the fact that the FOV of SDIS (~600 μm×600 μm) is smaller than that of Zygo profilometer (~834 μm×834 μm), as well as the fact that the sensor in SDIS has more pixels than that in Zygo profilometer (5M vs. 1M pixels), higher spatial resolution is obtained with SDIS within the same measurement area, thus, more obvious tool marks can be seen in panel (b).

To illustrate the feasibility of the prototype SDIS to measure large-aperture surfaces, a concave spherical surface with 50 mm diameter and 34 mm radius was cut and tested. Subaperture stitching was performed, which illustrated good agreement of the full-aperture surface map with a control experiment with Zygo interferometer.

One aspect of the disclosed embodiments relates to an interferometric system for measuring surface characteristics of an object that includes a collimator positioned to receive light from: (1) a first light source having a first wavelength or first range of wavelengths, and (2) a second light source having light with a smaller coherence length than light from the first light source, and a second wavelength or second range of wavelengths different from the first wavelength or first range of wavelengths, the interferometric system configured to selectively allow light from one of the light sources to reach the collimator at a given time. The interferometric system also includes a polarizer positioned to receive collimated light from the collimator and to produce polarized light, a polarizing optical element positioned to receive the polarized light and to direct light having a first polarization towards a first optical filter as part of a reference path of the interferometric system, and to direct light having a second polarization towards a second optical filter as part of a test path of the interferometric system, and a quarter wave plate positioned to receive the light having the first polarization in the reference path after reflection from the first optical filter or a reference optical element, and to receive light having the second polarization in the test path after reflection from the object, and to produce oppositely circularly polarized light beams. In the interferometric system the first optical filter is configured to allow the light having the first wavelength or the first range of wavelengths to reflect therefrom, and the light having the second wavelength or the second range of wavelengths to transmit therethrough for illumination of a reference optical element. Further, the second optical filter has a thickness or a material to impart the same optical path length to light having the second wavelength or range of wavelengths as the first optical filter and is configured to allow the light having the first wavelength or the first range of wavelengths, and the light having the second wavelength or the second range of wavelengths, to transmit therethrough for illumination of the object. The oppositely circularly polarized light beams, upon reaching a polarization sensitive camera at an image plane of the interferometric system and formation of a plurality of interferograms, enable measurements of a surface shape or a surface roughness of the object based on interferograms produced from light from the first light source or the second light source, respectively.

In one example embodiment, the interferometric system includes an imaging lens positioned to receive the oppositely circularly polarized light beams and to produce an image thereof at the image plane. In another example embodiment, the interferometric system includes the polarization sensitive camera that includes: a polarizer array having a plurality of polarizer elements, and a detector array configured to produce electrical signals based on detected intensities of the one or more interferograms. In yet another example embodiment, the interferometric system includes a first objective lens positioned in the reference path between the first optical filter and the reference optical element. In still another example embodiment, the interferometric system also includes a second objective lens positioned in the test path between the second optical filter and a location of the object.

According to one example embodiment, the interferometric system includes a dichroic mirror positioned to deliver light from the first and the second light sources to the collimator; the dichroic mirror is configured to allow light from one of the first or the second light sources to reach the collimator upon transmission through the dichroic mirror, and the other of the first or the second light sources to reach the collimator upon reflection from the dichroic mirror. In another example embodiment, the interferometric system is configured to: turn on the first light source and turn off the second light source to enable measurement of the surface shape, and turn off the first light source and turn on the second light source to enable measurement of the surface roughness. In another example embodiment, the interferometric system includes a folding mirror positioned to fold an optical path the light that is output from the collimator; and a beam splitter positioned to fold an optical path of the light beams that exit the polarizing beam splitter after reflection from the reference optical element or the first optical filter, and after reflection from the object.

In another example embodiment, the polarizer is a linear polarizer. In yet another example embodiment, the linear polarizer is a wire grid linear polarizer. In still another example embodiment, the linear polarizer has a transmission axis oriented at a particular angle that is adjustable to enable a change in fringe contrast for the plurality of interferograms. In one example embodiment, the linear polarizer has a transmission axis oriented at 45 degrees. In still another example embodiment, the reference optical element is a mirror. In yet another example embodiment, the polarizing optical element is a polarizing beam splitter. In one example embodiment, the interferometric system includes the first and the light sources. In another example embodiment, the first light source is a laser light source, and the second light source is a light emitting diode. In a particular example embodiment, the first wavelength or the first range of wavelengths is at, or around, 632.8 nm, and the second wavelength or the second range of wavelengths is at, or around, 540 nm.

According to another example embodiment, the first optical filter is a shortpass optical filter with a transmission cutoff wavelength that is less than the first wavelength or the first range of wavelengths, and the second optical filter is a longpass optical filter. In another example embodiment, the system is configured to measure the surface shape and the surface roughness by switching on or off the first and the second light sources without reconfiguration of components of the interferometric system.

Another aspect of the disclosed embodiments relates to a dual mode interferometric measurement system that includes a laser light source, a low coherence light source, a collimator to receive light selectively from only one, but not both of, the laser light source or the low coherence light source at a given time, a polarizer to receive light from the collimator, a polarization beam splitter (PBS) to receive light from the polarizer, and a first optical filter to receive a first type of polarized light from the PBS, where the first optical filter is configured to allow light from the laser light source to reflect therefrom and light from the low coherence light source to transmit therethrough. The above interferometric measurement system also includes a second optical filter to receive a second type of polarized light from the PBS, where the second optical filter is configured to allow light from the laser light source and the low coherence light source to pass therethrough toward a test surface. The interferometric measurement system further includes a reference mirror positioned to receive and reflect light corresponding to the low coherence light source after propagation through the first optical filter, and a quarter wave plate (QWP). The QWP is positioned to receive: (a) light associated with the laser light source after reflection from the first optical filter as part of a reference path associated with the laser light source and after reflection from the test surface as part of a test path associated with the laser light source, or (b) light associated with the low coherence light source after reflection from the reference mirror as part of a reference path associated with the low coherence light source and after reflection from the test surface as part of a test path associated with the low coherence light source. In the interferometric measurement system light that is output from the QWP, upon reaching a polarization sensitive camera at an image plane of the interferometric system and formation of a plurality of interferograms, enables a measurement of both a surface shape and a surface roughness of the object based on interferograms produced from light associated with the laser light source and the low coherence light source, respectively.

A related method to the aspects of the disclosed interferometric measurement systems relates to measuring surface shape and surface roughness of an object. The method includes turning on the laser light source and simultaneously turning off, or otherwise blocking, the low coherence light source to produce a first set of interferograms; then turning on the low coherence light source and simultaneously turning off, or otherwise blocking, the laser light source to produce a second set of interferograms. The method further includes measuring a surface shape of the object using the first set of interferograms and measuring a surface roughness of the object using the second set of interferograms. The order in which the light sources are turned on/off can be reversed. The measurement of surface shape and roughness can be carried out based on electrical signals that represent the first and the second set of interferograms that are received at a computing device. The computing device can include a processor and a memory with instructions stored thereon. The instructions upon execution by the processor configure the processor to receive and process the information associated with the interferograms, and to compute the surface shape and roughness.

At least part of the disclosed embodiments may be implemented using a system that includes at least one processor and/or controller, at least one memory unit that is in communication with the processor, and at least one communication unit that enables the exchange of data and information, directly or indirectly, through the communication link with other entities, devices, databases and networks. Such processors, controllers, and the associated memory and communication unit can be incorporated as part of the computer. The communication unit may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. For example, the processor and memory may be used to control the light sources, to operate the polarization cameras, to receive and process information obtained by the polarization cameras, and/or to control other components that are shown in FIGS. 1A to 1D.

The processor(s) may include central processing units (CPUs) to control the overall operation of, for example, the host computer. In certain embodiments, the processor(s) accomplish this by executing software or firmware stored in memory. For example, the processor may be programmed to process the information that it obtained from the polarization cameras to obtain a phase difference or a depth measurement. The processor(s) may be, or may include, one or more programmable general-purpose or special-purpose microprocessors, digital signal processors (DSPs), programmable controllers, application specific integrated circuits (ASICs), programmable logic devices (PLDs), graphics processing units (GPUs), or the like, or a combination of such devices.

The memory represents any suitable form of random access memory (RAM), read-only memory (ROM), flash memory, or the like, or a combination of such devices. In use, the memory may contain, among other things, a set of machine instructions which, when executed by processor, causes the processor to perform operations to implement certain aspects of the presently disclosed technology.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Only a few implementations and examples are described and other implementations, enhancements and variations can be made based on what is described and illustrated in this patent document.

What is claimed is:

1. An interferometric system for measuring surface characteristics of an object, comprising:
    a collimator positioned to receive light from:
        (1) a first light source having a first wavelength or first range of wavelengths, and
        (2) a second light source having light with a smaller coherence length than light from the first light source, and a second wavelength or second range of wavelengths different from the first wavelength or first range of wavelengths, the interferometric system configured to selectively allow light from one of the light sources to reach the collimator at a given time;
    a polarizer positioned to receive collimated light from the collimator and to produce polarized light;
    a polarizing optical element positioned to receive the polarized light and to direct light having a first polarization towards a first optical filter as part of a reference path of the interferometric system, and to direct light having a second polarization towards a second optical filter as part of a test path of the interferometric system; and
    a quarter wave plate positioned to receive the light having the first polarization in the reference path after reflection from the first optical filter or a reference optical element, and to receive light having the second polarization in the test path after reflection from the object, and to produce oppositely circularly polarized light beams, wherein
    the first optical filter is configured to allow the light having the first wavelength or the first range of wavelengths to reflect therefrom, and the light having the second wavelength or the second range of wavelengths to transmit therethrough for illumination of a reference optical element,
    the second optical filter having a thickness or a material to impart the same optical path length to light having the second wavelength or range of wavelengths as the first optical filter and configured to allow the light having the first wavelength or the first range of wavelengths, and the light having the second wavelength or the second range of wavelengths, to transmit therethrough for illumination of the object, and
    the oppositely circularly polarized light beams, upon reaching a polarization sensitive camera at an image plane of the interferometric system and formation of a plurality of interferograms, enable measurements of a surface shape or a surface roughness of the object based on interferograms produced from light from the first light source or the second light source, respectively.

2. The interferometric system of claim 1, comprising an imaging lens positioned to receive the oppositely circularly polarized light beams and to produce an image thereof at the image plane.

3. The interferometric system of claim 1, comprising the polarization sensitive camera that includes:
a polarizer array having a plurality of polarizer elements, and
a detector array configured to produce electrical signals based on detected intensities of the one or more interferograms.

4. The interferometric system of claim 1, comprising a first objective lens positioned in the reference path between the first optical filter and the reference optical element.

5. The interferometric system of claim 1, comprising a second objective lens positioned in the test path between the second optical filter and a location of the object.

6. The interferometric system of claim 1, comprising a dichroic mirror positioned to deliver light from the first and the second light sources to the collimator, wherein the dichroic mirror is configured to allow light from one of the first or the second light sources to reach the collimator upon transmission through the dichroic mirror, and the other of the first or the second light sources to reach the collimator upon reflection from the dichroic mirror.

7. The interferometric system of claim 1, configured to:
turn on the first light source and turn off the second light source to enable measurement of the surface shape, and
turn off the first light source and turn on the second light source to enable measurement of the surface roughness.

8. The interferometric system of claim 1, comprising:
a folding mirror positioned to fold an optical path the light that is output from the collimator; and
a beam splitter positioned to fold an optical path of the light beams that exit the polarizing beam splitter after reflection from the reference optical element or the first optical filter, and after reflection from the object.

9. The interferometric system of claim 1, wherein the polarizer is a linear polarizer.

10. The interferometric system of claim 9, wherein the linear polarizer is a wire grid linear polarizer.

11. The interferometric system of claim 9, wherein the linear polarizer has a transmission axis oriented at a particular angle that is adjustable to enable a change in fringe contrast for the plurality of interferograms.

12. The interferometric system of claim 9, wherein the linear polarizer has a transmission axis oriented at 45 degrees.

13. The interferometric system of claim 1, wherein the reference optical element is a mirror.

14. The interferometric system of claim 1, wherein the polarizing optical element is a polarizing beam splitter.

15. The interferometric system of claim 1, comprising the first and the light sources.

16. The interferometric system of claim 1, wherein the first light source is a laser light source, and the second light source is a light emitting diode.

17. The interferometric system of claim 16, wherein the first wavelength or the first range of wavelengths is at, or around, 632.8 nm, and the second wavelength or the second range of wavelengths is at, or around, 540 nm.

18. The interferometric system of claim 1, wherein the first optical filter is a shortpass optical filter with a transmission cutoff wavelength that is less than the first wavelength or the first range of wavelengths, and the second optical filter is a longpass optical filter.

19. The interferometric system of claim 1, wherein the system is configured to measure the surface shape and the surface roughness by switching on or off the first and the second light sources without reconfiguration of components of the interferometric system.

20. A dual mode interferometric measurement system, comprising:
a laser light source;
a low coherence light source;
a collimator to receive light selectively from only one, but not both of, the laser light source or the low coherence light source at a given time;
a polarizer to receive light from the collimator;
a polarization beam splitter (PBS) to receive light from the polarizer;
a first optical filter to receive a first type of polarized light from the PBS, the first optical filter configured to allow light from the laser light source to reflect therefrom and light from the low coherence light source to transmit therethrough;
a second optical filter to receive a second type of polarized light from the PBS, the second optical filter configured to allow light from the laser light source and the low coherence light source to pass therethrough toward a test surface;
a reference mirror positioned to receive and reflect light corresponding to the low coherence light source after propagation through the first optical filter; and
a quarter wave plate (QWP) positioned to receive:
(a) light associated with the laser light source after reflection from the first optical filter as part of a reference path associated with the laser light source and after reflection from the test surface as part of a test path associated with the laser light source, or
(b) light associated with the low coherence light source after reflection from the reference mirror as part of a reference path associated with the low coherence light source and after reflection from the test surface as part of a test path associated with the low coherence light source, wherein:
light that is output from the QWP, upon reaching a polarization sensitive camera at an image plane of the interferometric system and formation of a plurality of interferograms, enables a measurement of both a surface shape and a surface roughness of the object based on interferograms produced from light associated with the laser light source and the low coherence light source, respectively.

* * * * *